(12) United States Patent
Brown et al.

(10) Patent No.: US 10,375,082 B2
(45) Date of Patent: Aug. 6, 2019

(54) METHOD AND APPARATUS FOR GEOGRAPHIC LOCATION BASED ELECTRONIC SECURITY MANAGEMENT

(71) Applicant: Averon US, Inc., Henderson, NV (US)

(72) Inventors: Wendell Brown, Henderson, NV (US); Edward Mehr, Long Beach, CA (US)

(73) Assignee: AVERON US, INC., Henderson, NV (US)

( * ) Notice: Subject to any disclaimer, the term of this patent is extended or adjusted under 35 U.S.C. 154(b) by 23 days.

(21) Appl. No.: 15/243,786

(22) Filed: Aug. 22, 2016

(65) Prior Publication Data

US 2017/0195339 A1 Jul. 6, 2017

Related U.S. Application Data

(60) Provisional application No. 62/207,883, filed on Aug. 20, 2015.

(51) Int. Cl.
*H04L 29/06* (2006.01)
*H04W 4/80* (2018.01)
(Continued)

(52) U.S. Cl.
CPC ............ *H04L 63/107* (2013.01); *G06F 21/34* (2013.01); *H04L 63/0492* (2013.01);
(Continued)

(58) Field of Classification Search
CPC ... H04L 63/107; H04L 63/0861; H04L 67/42; H04L 63/0492; H04W 4/80; H04W 12/06; G06F 21/34
See application file for complete search history.

(56) References Cited

U.S. PATENT DOCUMENTS

2009/0300745 A1* 12/2009 Dispensa ............ H04L 63/0869 726/7
2010/0291952 A1* 11/2010 Gosset .................... H04W 4/02 455/466

(Continued)

FOREIGN PATENT DOCUMENTS

GB 2492050 A 12/2012

OTHER PUBLICATIONS

PCT International Search Report and Written Opinion of the International Searching Authority for application PCT/US2016/048084 dated Oct. 31, 2016.
(Continued)

*Primary Examiner* — Joseph P Hirl
*Assistant Examiner* — J. Brant Murphy
(74) *Attorney, Agent, or Firm* — Alston & Bird LLP

(57) ABSTRACT

Provided herein are embodiments directed to facilitating an authentication process before allowing an action. An example apparatus may be configured to receive a request, via an authentication session established during a log-in process, to cause the action, send alert to a first device associated with an account associated with the requested action, cause the first device to communicate, via the short range wireless communication protocol, with a second device to verify a proximity, receive verification of the proximity, receive a first identifying data originating in a browser having been used to start the authentication session, receive a second identifying data string originating from a trusted agent, configured as software or hardware, residing on the second device, and upon confirmation of a match of the first identifying data string and the second identifying data string, authorize the action.

21 Claims, 9 Drawing Sheets

(51) Int. Cl.
*H04W 12/06* (2009.01)
*G06F 21/34* (2013.01)

(52) U.S. Cl.
CPC ...... *H04L 63/0853* (2013.01); *H04L 63/0861* (2013.01); *H04W 4/80* (2018.02); *H04W 12/06* (2013.01); *H04L 67/42* (2013.01)

(56) References Cited

U.S. PATENT DOCUMENTS

| | | | | |
|---|---|---|---|---|
| 2011/0238514 | A1* | 9/2011 | Ramalingam | H04W 4/029 705/21 |
| 2012/0203663 | A1 | 8/2012 | Sinclair et al. | |
| 2013/0203383 | A1* | 8/2013 | Stopel | H04W 12/08 455/411 |
| 2013/0204690 | A1* | 8/2013 | Liebmann | G06Q 30/0225 705/14.26 |
| 2014/0282978 | A1* | 9/2014 | Lerner | H04L 63/083 726/7 |
| 2014/0289116 | A1* | 9/2014 | Polivanyi | G06Q 20/42 705/44 |
| 2014/0351899 | A1* | 11/2014 | Dennis | H04W 12/06 726/4 |
| 2015/0133172 | A1* | 5/2015 | Silverman | H04W 4/023 455/456.6 |
| 2017/0265238 | A1* | 9/2017 | Li | H04W 76/023 |

OTHER PUBLICATIONS

Unknown., "Extracts of ENVI User's Guide", Retrieved from the internet: URL:http://www.harrisgeospatial.com/portals/0/pdfs-envi/ENVI_User_Guide.pdf, [retrieved on Feb. 12, 2019] dated Dec. 1, 2009, pp. 69, 124, 156.

Extended European Search Report for European Application No. 16849900.2 dated Feb. 20, 2019.

* cited by examiner

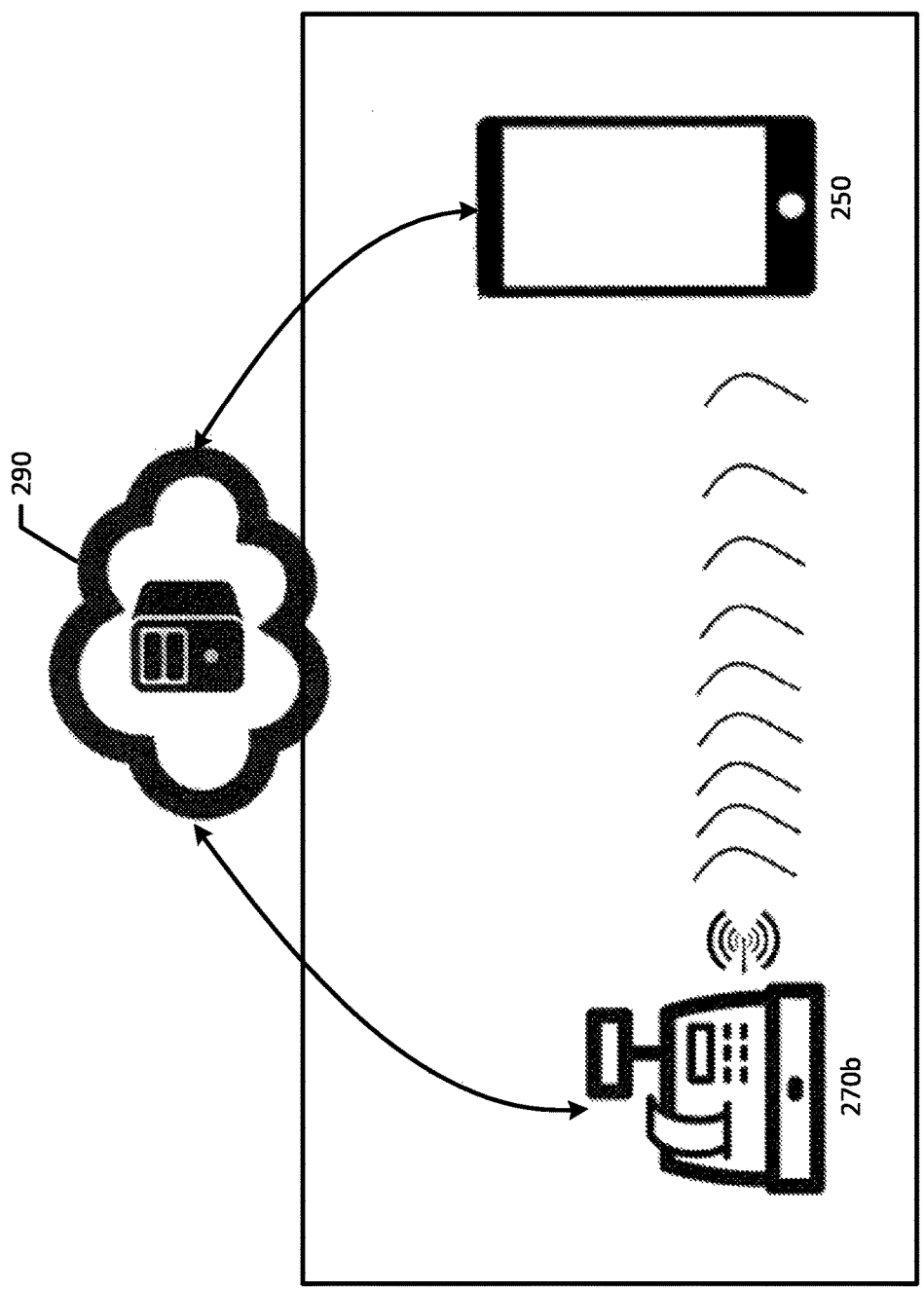

METHOD AND APPARATUS FOR GEOGRAPHIC LOCATION BASED ELECTRONIC SECURITY MANAGEMENT

CROSS REFERENCE TO RELATED APPLICATIONS

This application claims the benefit of U.S. Provisional Patent Application No. 62/207,883, titled "METHOD AND APPARATUS OF GEOGRAPHIC-BASED ELECTRONIC SECURITY MANAGEMENT," filed Aug. 20, 2015, which is incorporated by reference herein in its entirety.

TECHNOLOGICAL FIELD

Embodiments of the invention relate, generally, to methods and apparatus for geographic location based electronic security management and account access control. The present invention relates more particularly to securing access, preventing access, auditing, tracking, providing flexible and customized authentication processes, and protecting against false or hacked credentials relating to electronic account access, management, and modifications.

BACKGROUND

Conventional user access and control into electronic systems has focused on the user proving who he is—user authentication. Methods such as password entry and various test questions (e.g. what year was your mother born?) are based on the assumption that those questions are either unknown to other people or are difficult to guess, both of which are proving to be false design assumptions. That is, if another person guesses, steals, or otherwise finds out that information, an unauthorized user can gain entry into that system. Additionally, systems such as two-factor authentication by email, SMS, or a uniquely generated code on the device, all require the possession of a device or an email address to gain access, validating "what" in addition to "who." Nevertheless, those systems are trivial to break when a device is lost or stolen.

The applicant has discovered problems with current methods, systems, and apparatuses for electronic security management and account access control. Through applied effort, ingenuity, and innovation, Applicant has solved many of these identified problems by developing a solution that is embodied by the present invention, which is described in detail below.

BRIEF SUMMARY

Some embodiments may provide geographic location based electronic security management and account access control. In some embodiments, an authentication apparatus may be provided, the authentication apparatus comprises at least one processor and at least one memory including computer program code, the at least one memory and the computer program code configured to, with the processor, cause the authentication apparatus to at least receive a request to cause an action from a second device, cause the first device to communicate with a second device to verify a proximity of the first device and the second device, receive verification of the proximity, receive a first identifying data string, receive a second identifying data string, upon confirmation of a match of the first identifying data string and the second identifying data string, authorizing the action.

In some embodiments, the at least one memory and the computer program code are further configured to, with the processor, cause the apparatus to receive data indicative of a biometric input at the first device, and preceding authorization of the action, confirming a match of the data indicative of the biometric input to stored biometric data associated with a user of the first device.

In some embodiments, the at least one memory and the computer program code configured to cause the first device to communicate with the second device to verify the proximity of the first device and the second device is further configured to, with the processor, cause the apparatus to receive an indication of a location of the first device by means of GPS, Wi-Fi, or mobile network location information, compare the location of the first device to a location of the second device, the second device having a verifiable or confirmed location and being independent to the first device, verifying the proximity of the first device to the second device, confirming the location of the first device based on the verifiable or confirmed location of the second device.

In some embodiments, the at least one memory and the computer program code are further configured to, with the processor, cause the apparatus to upon determination of the location of the first device and preceding authorization of the action, determine the location is within a predefined authorized geo-region.

In some embodiments, the at least one memory and the computer program code are further configured to, with the processor, cause the apparatus to upon determination of the location of the first device and preceding authorization of the action, determine the location is within a predefined range of a pre-defined authorized location.

In some embodiments, the at least one memory and the computer program code are further configured to, with the processor, cause the apparatus to upon determination of the location of the first device and preceding authorization of the action, determine the location is not within a predefined un-authorized geo-region.

In some embodiments, the at least one memory and the computer program code are further configured to, with the processor, cause the apparatus to upon determination of the location of the first device by means of GPS, Wi-Fi, or mobile network location information and preceding authorization of the action, receive input at a third device, and upon verification of input at the third device, authorize the action.

In some embodiments, an authentication method may be provided, the method comprising receiving a request to cause an action from a second device, causing the first device to communicate with a second device to verify a proximity of the first device and the second device, receiving verification of the proximity, receiving a first identifying data string, receiving a second identifying data string, upon confirmation of a match of the first identifying data string and the second identifying data string, authorizing the action.

In some embodiments, the method may further comprise receiving data indicative of a biometric input at the first device, and preceding authorization of the action, confirming a match of the data indicative of the biometric input to stored biometric data associated with a user of the first device.

In some embodiments, the causing the first device to communicate with the second device to verify the proximity of the first device and the second device, further comprises receiving an indication of a location of the first device by means of GPS, Wi-Fi, or mobile network location information, comparing the location of the first device to a location of the second device, the second device having a verifiable or confirmed location and being independent to the first device, verifying the proximity of the first device to the second device, confirming the location of the first device based on the verifiable or confirmed location of the second device.

In some embodiments, the method may further comprise, upon determination of the location of the first device and preceding authorization of the action, determining the location is within a predefined authorized geo-region.

In some embodiments, the method may further comprise, upon determination of the location of the first device and preceding authorization of the action, determining the location is within a predefined range of a pre-defined authorized location.

In some embodiments, the method may further comprise, upon determination of the location of the first device and preceding authorization of the action, determining the location is not within a predefined un-authorized geo-region.

In some embodiments, the method may further comprise, upon determination of the location of the first device by means of GPS, Wi-Fi, or mobile network location information and preceding authorization of the action, receive input at a third device, and upon verification of input at the third device, authorizing the action.

In some embodiments, a computer program product may be provided, the computer program product comprising at least one non-transitory computer-readable storage medium having computer-executable program code instructions stored therein, the computer-executable program code instructions comprising program code instructions for receiving a request to cause an action from a second device, causing the first device to communicate with a second device to verify a proximity of the first device and the second device, receiving verification of the proximity, receiving a first identifying data string, receiving a second identifying data string, upon confirmation of a match of the first identifying data string and the second identifying data string, authorizing the action.

In some embodiments, the computer-executable program code instructions further comprise program code instructions for receiving data indicative of a biometric input at the first device, and preceding authorization of the action, confirming a match of the data indicative of the biometric input to stored biometric data associated with a user of the first device.

In some embodiments, the computer-executable program code instructions for causing the first device to communicate with the second device to verify the proximity of the first device and the second device, further comprise program code instructions for receiving an indication of a location of the first device by means of GPS, Wi-Fi, or mobile network location information, comparing the location of the first device to a location of the second device, the second device having a verifiable or confirmed location and being independent to the first device, verifying the proximity of the first device to the second device, confirming the location of the first device based on the verifiable or confirmed location of the second device.

In some embodiments, the computer-executable program code instructions further comprise program code instructions for upon determination of the location of the first device and preceding authorization of the action, determining the location is within a predefined authorized geo-region.

In some embodiments, the computer-executable program code instructions further comprise program code instructions for upon determination of the location of the first device and preceding authorization of the action, determining the location is within a predefined range of a pre-defined authorized location.

In some embodiments, the computer-executable program code instructions further comprise program code instructions for upon determination of the location of the first device and preceding authorization of the action, determining the location is not within a predefined un-authorized geo-region.

In some embodiments, the computer-executable program code instructions further comprise program code instructions for upon determination of the location of the first device by means of GPS, Wi-Fi, or mobile network location information and preceding authorization of the action, receive input at a third device, and upon verification of input at the third device, authorizing the action.

Other systems, methods, and features will be, or will become, apparent to one with skill in the art upon examination of the following figures and detailed description. It is intended that all such additional systems, methods, features to be included within this description, be within the scope of the disclosure, and be protected by the following claims.

BRIEF DESCRIPTION OF THE SEVERAL VIEWS OF THE DRAWINGS

Figure 1:
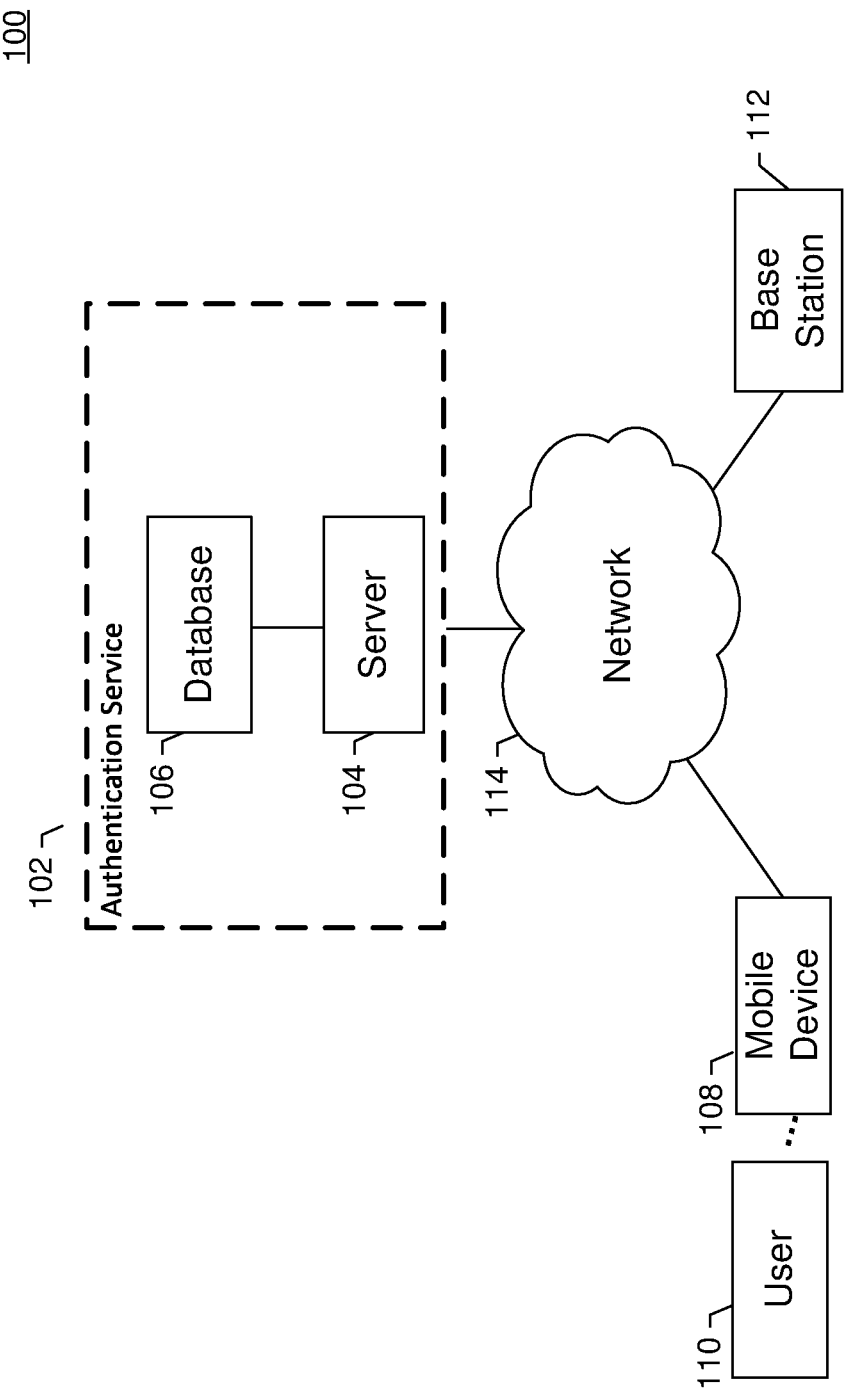

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention.

Figure 2A:
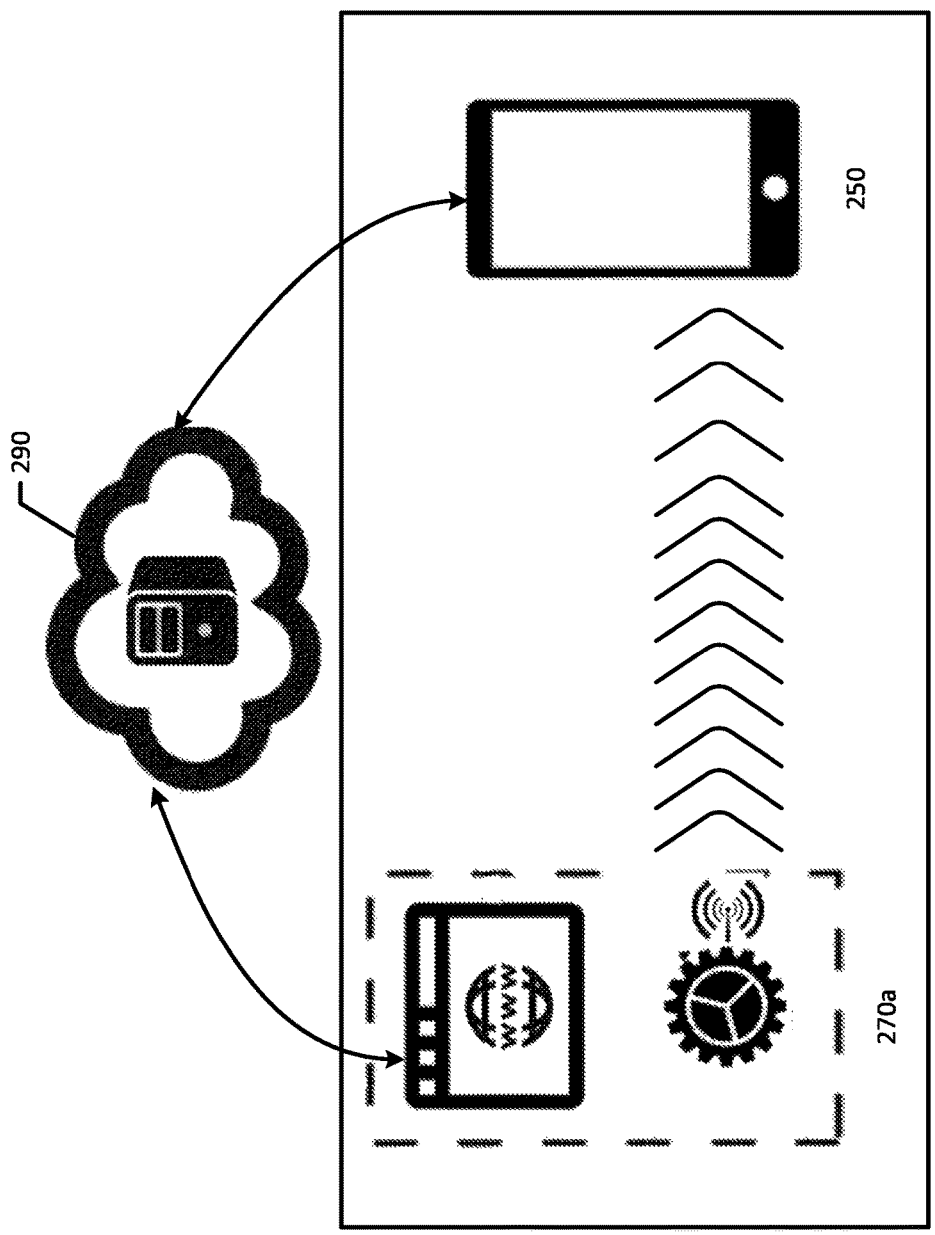

FIGS. 2A and 2B show exemplary systems that may be utilized in accordance with some exemplary embodiments of the present invention.

Figure 3:
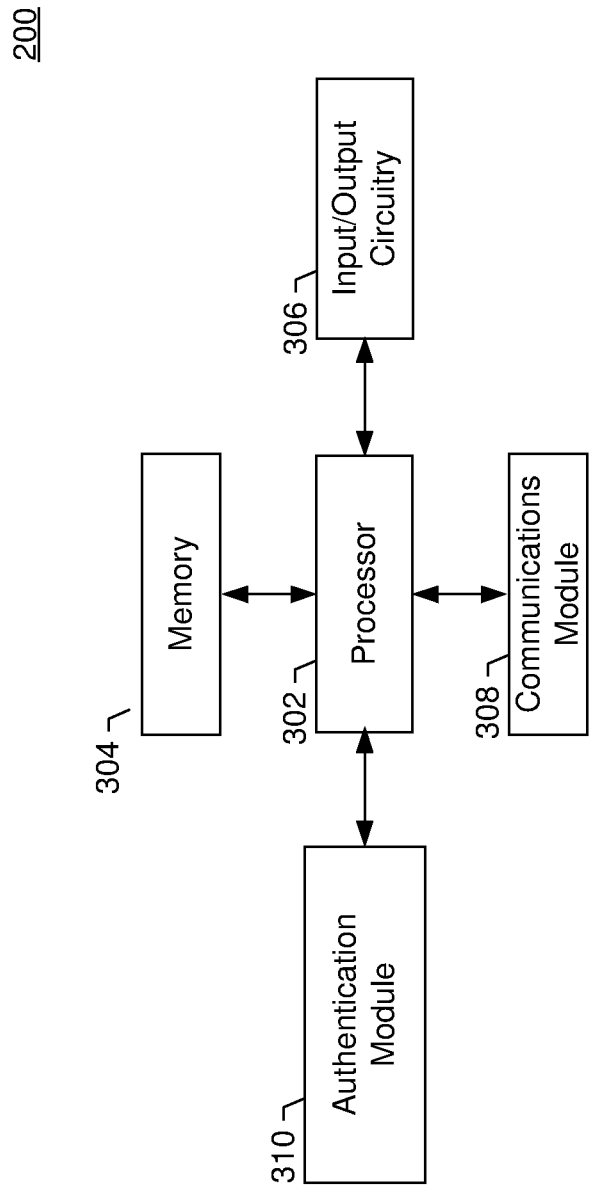

FIG. 3 shows a block diagram showing an example device, using special-purpose circuitry in accordance with some exemplary embodiments of the present invention.

Figure 4:
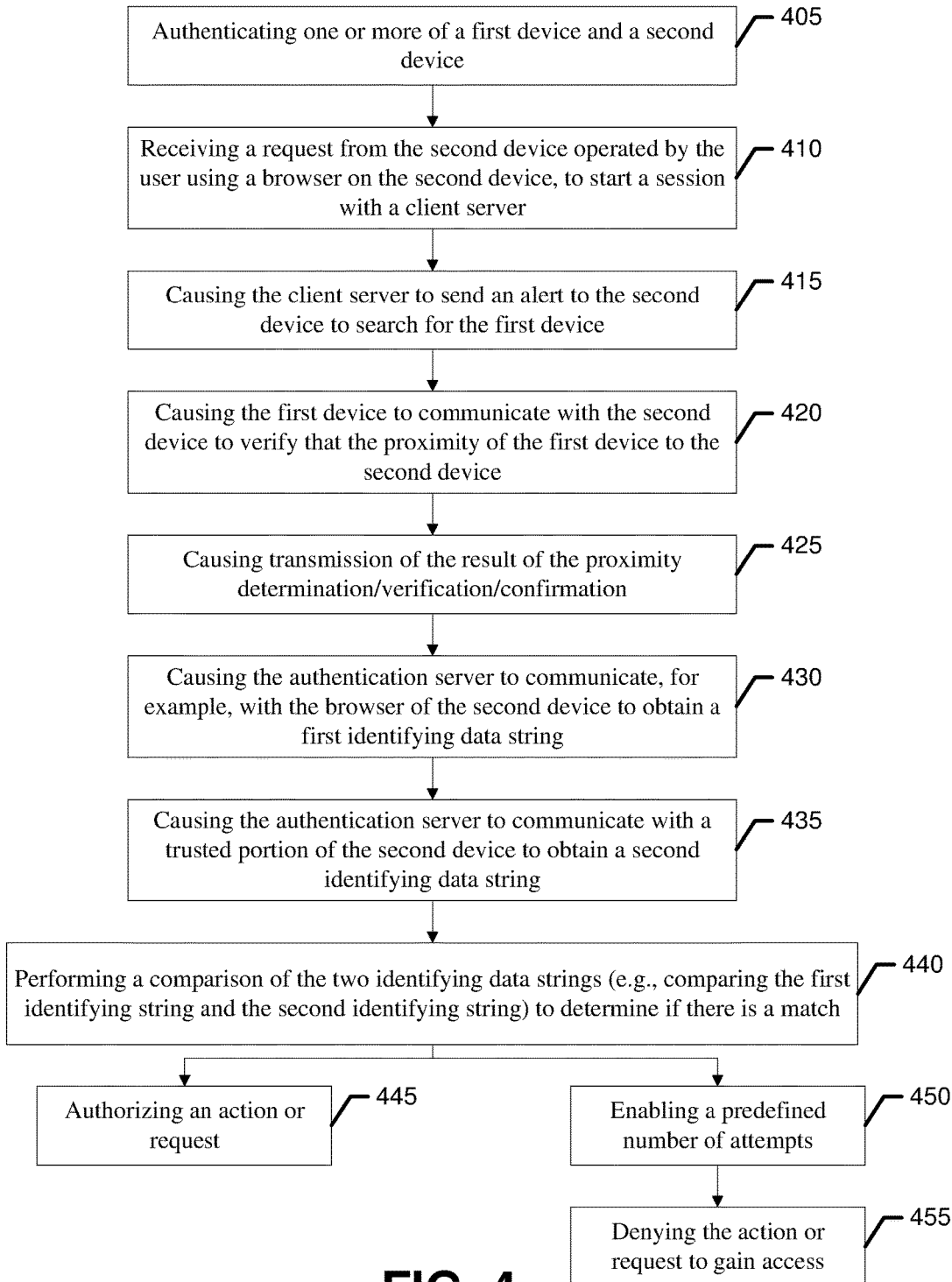
Figure 5:
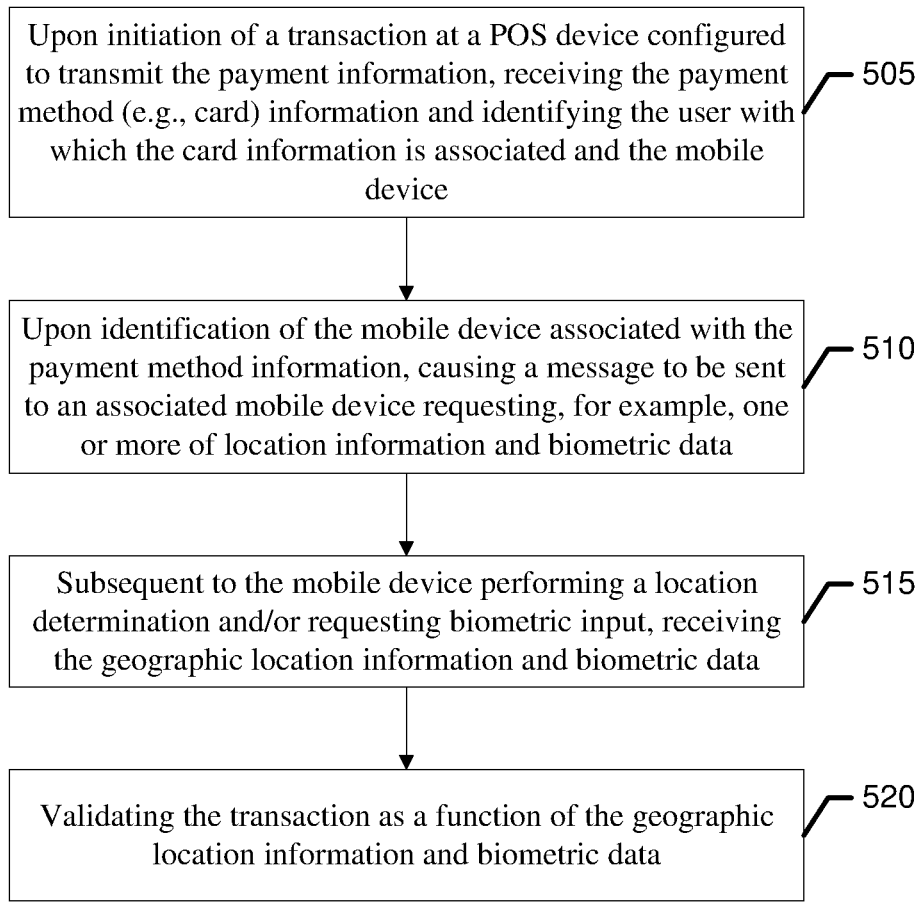

FIGS. 4 and 5 show flowcharts depicting example operations, in accordance with some example embodiments discussed herein.

Figure 6:
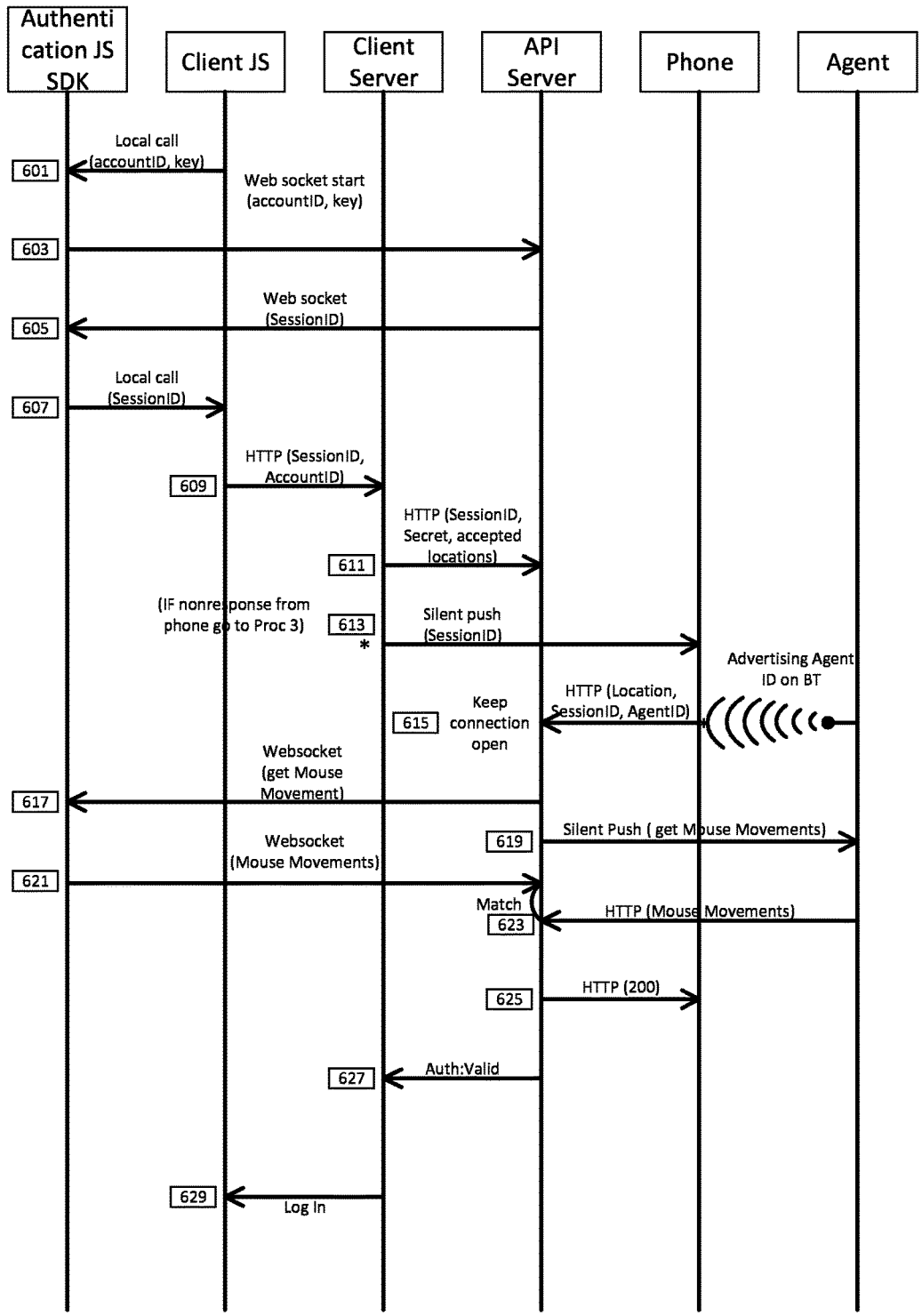

FIG. 6 shows a data flow depicting example operations for performing a process, in accordance with some example embodiments discussed herein.

Figure 7:
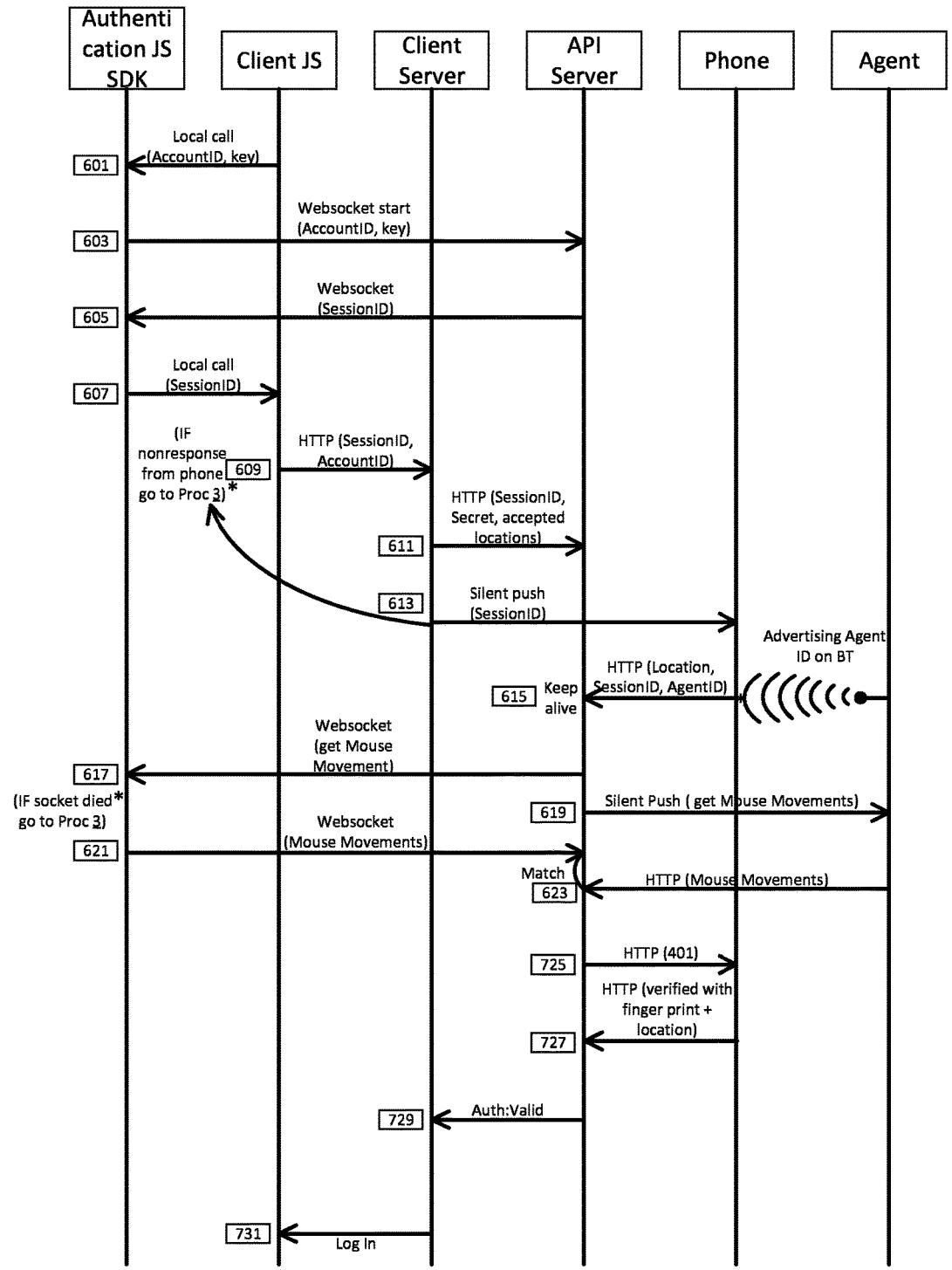

FIG. 7 shows a data flow depicting example operations for performing a process, in accordance with some example embodiments discussed herein.

Figure 8:
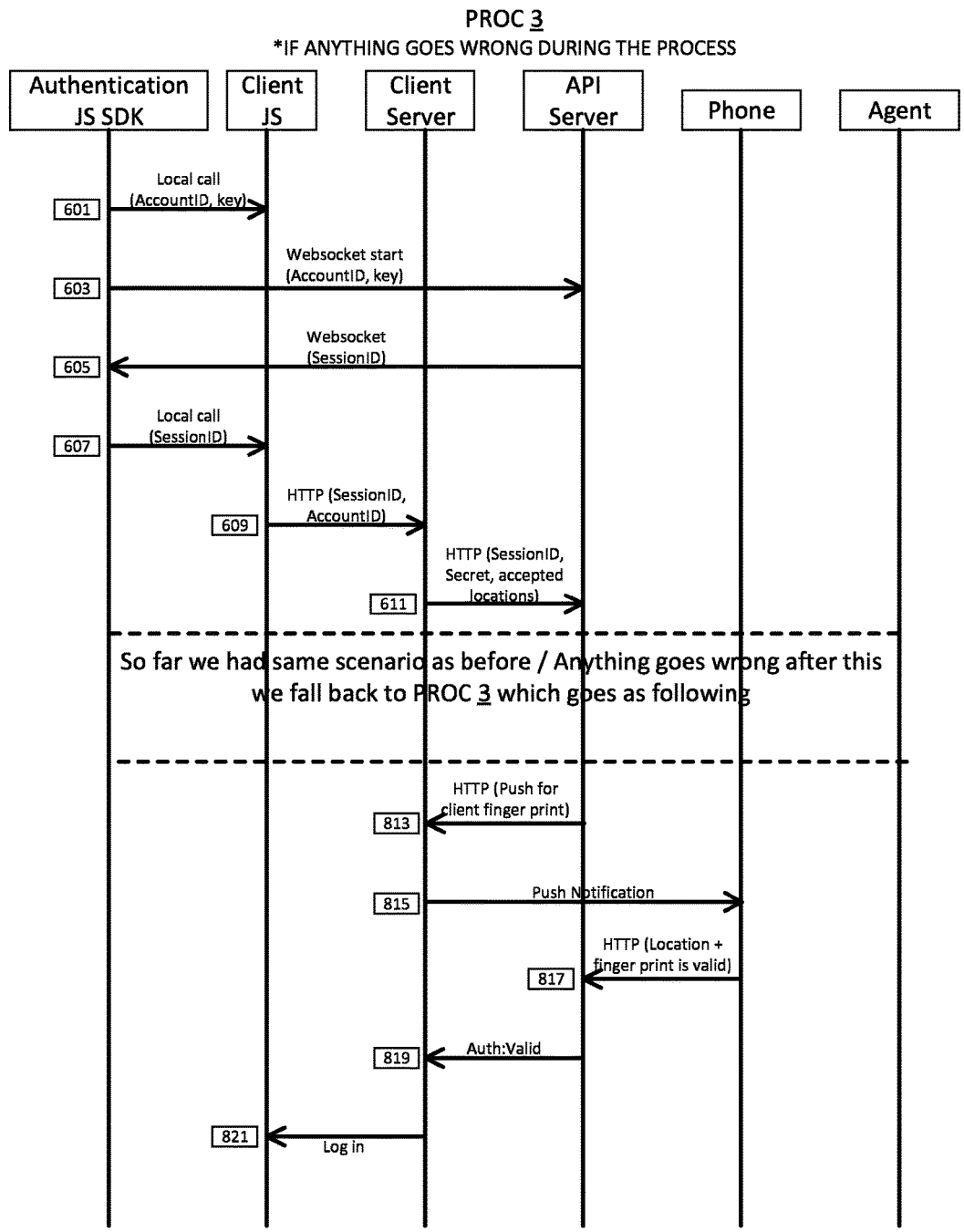

FIG. 8 shows a data flow depicting example operations for performing a process, in accordance with some example embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Various embodiments of the present invention are directed to improved systems, apparatuses, methods, and computer readable media providing geographic-based electronic security management and account access control.

Embodiments of the present invention provide an additional security layer to the electronic access control paradigm, going beyond validating in addition to "who" but also to "where" the user is. Some studies have shown that over 95% of certain hacking activities occur in geographies that are not only predictable, but that are well outside of a typical user's travel range. Thus geographic limitations, when verified properly, can significantly help to filter, detect, and prevent many hackings. In accordance with one aspect of the present invention, geographic inputs are used to enable access by authorized users and to deny access by unauthorized users.

In accordance with embodiments of the present invention, a hardware-based device (e.g., a mobile phone) associated with a user's account, of which device's location can be independently verified by a highly-secure third-party, is added into the overall security process. While prior systems have looked at a user's IP network address as a means to indicate where a network-connected user is, this method is not secure—a user's IP address can easily be manipulated (e.g., by the user signing in through a VPN tunnel), or can simply be user manipulated. In accordance with the present invention, a user's geographic position reported by a third party (for example a wireless network operator, such as a cell phone operator, or a cable television operator, or an automated teller machine (ATM) network operated by a bank) in a reliable, highly-secure, redundant, and verifiable manner is included in the security process. In embodiments where the user position is established by a wireless mobile device associated with the user via, for example, a GPS system, the strength of the signal as received by the base station that is in communications with the mobile device may be used to enhance the accuracy with which the user's position is determined and thereby increase the security level used to perform authentication.

The geographic location information may be obtained either by methods whereby a user's device self-reports (e.g., a GPS receiver), by methods whereby a location of the user to reported by an external-to-the-user system (e.g., a mobile phone network operator reports the user's location), methods whereby the user's location is computed by calculating time delays of signals transmitted or received by the user's device to/from one or more other transmitters/receivers, other electronic locations means, or any combinations of the above. The term "GPS" as used herein is meant to include any Global Positioning System—whether it be a USA-managed GPS system, a Russian-managed GLONASS system, military global positioning systems, commercial global positioning systems, satellite-based or terrestrial systems or any other systems meant to provide a user's physical position. The term "GPS location" as used herein is meant to include latitude, longitude, and altitude, and any other derivative (such as speed) as a result of the GPS location information.

FIG. 1 shows a user 110 carrying an associated mobile device 108 that is configured for communication with base station 112. Base station 112, in turn, communicates with one or more servers 104. In accordance with one aspect of the present invention, the position of mobile device 108, and hence user 110, as determined by base station 112 is compared to an expected position of the user as part of the user authentication process. The expected position of the user typically covers a geo-region previously defined by the user.

Technical Underpinnings and Implementation of Exemplary Embodiments

Conventional systems used to determine a user's location, such as IP-based location lookups, or the self-reported GPS location of a mobile device associated with the user are not reliable. A user's IP address may be easily manipulated, for example, by the user signing in through a VPN tunnel. A device's self-reported location is not reliable either—a device may simply be configured to self-report wrong information.

Embodiments of the present invention, among other advantages, reduce unauthorized access to or monitoring of an account. Embodiments of the present invention further control and limit access to an account determined to be the target of unauthorized users by adding a reputable, third-party supplied source of the user's geographic location. Geographic inputs are thus used to enable authorized users to gain access to their account, while impeding unauthorized users from doing so.

In accordance with one aspect of the present invention the user pre-defines one or more geo-points or geo-regions from which he agrees to self-limit himself to future account actions. A user defined geo-range could be used to include or exclude geo-regions from future account activity. This action self-limits or blocks future actions by unauthorized people attempting to hack into the account. The user could select common default settings (e.g., within the 48 continental states) or custom-define one or more general geo-regions to enable or disable authorized access. The user may further select one or more specific geo-points from which the user may self-limit certain account activity (such as password changes). Such a method may be used in combination with other physical access security for further combinational security. For example, a military account may be pre-configured such that any future account control changes may be made only from a building within a specific Air Force Base. Thus, to gain access to an account, not only does the user have to be at that specific location, but to reach that building the user also has to penetrate that Air Force bases physical perimeter security (such as a guard gate, break through fences, etc.), in addition to knowing certain account login information.

Electronic accounts may include email accounts (e.g., Google Gmail, Outlook, Yahoo Mail, etc.), file management accounts (e.g., DropBox, OneDrive, Box, etc.), social media accounts (e.g., LinkedIn, Facebook, Twitter, etc.), financial accounts (e.g., bank accounts, credit card accounts, stock brokerage accounts, etc.), business-related accounts (e.g., Sales Force, etc.), hardware management accounts (to control routers, firewalls, cameras, thermostats, cars, airplanes, space satellites, remote vehicle control, etc.), home security and smart home accounts (e.g., Nest), game and entertainment related accounts (e.g., NetFlix, Hulu, Sony Playstation, Steam, Zynga, Electronic Arts online gaming account, Spotify music account, Etc.), communications accounts (e.g., Skype, eFax, GoToMeeting, etc.), travel related accounts (e.g., Expedia, Orbitz, United Airlines), retail accounts (e.g., Amazon, WalMart.com, etc.), manufacturing electronic accounts (such that contain 3D printer files, chemical plant management accounts, etc.), school or other educational accounts (e.g., teacher accounts, student accounts, educational materials accounts, etc.), legal related online accounts, food ordering accounts (e.g., pizzahut.com, etc.), or any other type of electronic account as used by individuals, businesses, or enterprises, governments, or any other entities.

Such electronic accounts may exist in "the cloud" (on servers and databases connected to the internet) or on corporate or enterprise servers, or which exist on any computing device. Some devices themselves keep local accounts (e.g., routers, firewalls, mobile phones, etc.), and which may include portable and/or wearable computing devices (e.g., smart mobile phones, smart watches, smart eyeglasses, tablets, etc.) as well as non-mobile devices (e.g., desktops, laptops, etc.).

A mobile network operator (e.g., AT&T, Verizon, etc.) has direct, independent knowledge of user's whereabouts based on the cell tower network which that user's device is assigned to (often, but not always, which is closest to). Cellular-based wireless networks typically have many local "cells" of which a user is assigned to and a user is assigned a "slot" (or frequency to) for that particular cell. When a user moves, he may be reassigned to a new cell (and usually to a different frequency slot) for which an automatic transition (hand-off) is made when a user moves. Thus the mobile network knows the cell tower that is assigned to the user.

Embodiments of the present invention may be implemented in hardware, software, firmware or any of these combinations. In one embodiment, one hardware unit (such as a mobile phone) executes a first portion of software and/or firmware in accordance with embodiments of the present invention, and other hardware unit (such as servers in the cloud) executes a second portion of software in accordance with embodiments of the present invention. Other software programs may control and manage a database and other stored data.

In accordance with some embodiments of the present invention, a network-reported user's location is used as an independent source of verifying a user's position and identity. Such a network may also approximate a device's location by triangulating relative signal strengths received from multiple cell towers, etc. (this triangulation technique has been used by prior surveillance systems). Any other such third-party network, e.g., ATM network, may be used. For example, when a user enters a unique credit or debit card and optionally verifies a PIN code, the location of that transaction is transmitted to a known source such as a server, where it can be used to verify the user's location. ATMs tend to have excellent physical security measures in place, as well; oftentimes, they are recorded on a closed-circuit TV network and have security guards or other security controls onboard or nearby.

In accordance with another example embodiment, a secure, third-party location service relies on a timed or unique user action performed on a cable, internet, or satellite-enabled TV access device such as DirectTV's DVR, TiVo, or Dish Network's DVR to determine the user's position. TV access cards and their associated access devices have evolved and now utilize advanced security protocols to prevent hackers and thieves from stealing premium television channels and content without a subscription. The boxes are typically locked within a home or office, and therefore may also have advanced physical security already in place to protect them, including security guards, cameras, alarm systems, and strong doors with deadbolts. The action performed by a user to verify his or her location would have to be uniquely or likely identifiable to that user, such as browsing to a random, atypical channel when prompted on their phone within a set time limit; accessing one of the TV box's built-in or downloadable applications; entering a unique PIN code when prompted; or any such other action likely to not be performed by mistake.

In some embodiments, a user associates one or more of his/her devices (such as his/her mobile phones) to his/her account. Such devices would be able to have their location's determined as described above. In one embodiment, a user's device may be further validated as being under that user's control (such as by entering an assigned PIN number or other verifiable input). In one embodiment, a user's list of associated devices would be stored in the "cloud" in a hashed or other secure method. The location of the user's device associated devices may be stored in one or more locations (such as multiple or assigned) co-location storage devices/areas.

In some embodiments, to improve accuracy, a user's position may be determined using a multitude of independent cell operators (also referred to herein as carriers). Accordingly, the position of the user is determined not only by a first carrier with which the user is registered (e.g., AT&T) but also by a second independent carrier (e.g., Verizon) with which the user is not registered. In some embodiments, the signal strength of the user's device as received by the base stations operated by such first and second carriers may be used to enhance the position accuracy and thus improve access security.

In some embodiments, integrates a user's device geographic location information as reported by the user's device (self-reported GPS location) is integrated and further authenticated by processing additional verification information transmitted together with the time and location information supplied by one or more satellites. For example, the Russian GLOSNOSS "GPS" system can transmit additional encrypted information along with the satellites' location information, protected by a private/public key system. The encrypted information when decrypted provides authentication that the calculated GPS position information was authentic. The signal data could be verified by having access to the appropriate decryption key information. The decryption/verification step could be done either on the device, or that raw data could be relayed through the device, transmitted to another party for verification (who does have access to the necessary decryption keys). To provide additional protection, such keys could be rotated on a timely basis.

In some embodiments, a method of client-reported location approximation is based on local sensed mobile towers, Wi-Fi stations, or other device-reported means. In some embodiments, a user's device geographic location information as reported by the user's device is integrated (self-reported GPS location or client-reported location approximation based on local seen mobile tower, Wi-Fi stations, or other device-reported means). In some embodiments, a user's device geographic location information from multiple sources (for example location as reported by both use-device-reported GPS location and by mobile network reported location) are integrated.

In some embodiments, a user's device's prior determined location (the user may "set" this location to be one or more of his preferred "secret" locations from which account changes are allowed to occur) may be compared to the user's presently determined location to see if there is a match. If and only if there is a match, then certain actions (for example a password change) is approved. Such locations could be stored in a hashed table or other one-way algorithm encrypted tables to avoid saving the plain-text location in a database (to avoid disclosing his chosen locations if the user database was later hacked). In some embodiments, a user's selected or preset location (for example by entering a street address or my clicking on a visual map in Google Maps) is compare to later determined locations to see if there is a match. If and only if there is a match, certain actions (e.g., a password change) may be approved.

In some embodiments, a user may pre-select one or more narrowly defined "geo-points" (e.g. within 100 feet of a specific location) locations for use in authentication. Examples could be a specific street corner, a specific restaurant, a home, an office, or an otherwise specific location that only the user would decide in advance. In one embodiment, to aide in the security of the stored "geo-point" locations, the user's "geo-points" may be one-way hashed and stored into a database.

In some embodiments, a user pre-configures one or more "geo-points" into his account as "pre authorized locations from which I'll login to my account or to make selected changes to my account (e.g., password change)." In some embodiments, a user may enter or accept default or suggested settings of "geo-regions". Examples of a "geo-region" might be a small region (e.g., a house, a floor on an office building, a restaurant), a city (e.g., Los Angeles), a state (e.g., California), or a broader region (e.g., the 48 continental USA states). In such embodiments, the user's pre-assigned device (e.g., a mobile phone) is first determined to be physically within that "geo-region in order to enable the user to login or to make selected changes to an account (e.g., to change a password).

In some embodiments, the detection of the position of the user's device within one or more pre-selected geo-regions enables authorized access. In some embodiments, the detection of the position of the user's device within one or more predefined geo-regions disables access to the target account. In some embodiments, a user's altitude (e.g., the 40th floor of a tall building), in addition to latitude and longitude, may also be used in defining the "geo-points".

Some embodiments of the present invention may be directed to controlling access to hardware devices such as routers, firewalls, network switches, etc. A hardware device may have a pre-configured set of authorized users (which would, in-turn, each mat have a set of pre-assigned devices of which locations can be determined). Thus if a network administrator decides to make changes to a hardware firewall's configuration, the user's device location would have to be verified (for example by using geo-points or geo-regions).

In some embodiments, a device's list of authorized users and a user's list of authorized devices for which location can be determined is stored locally in a memory disposed in the device. In one embodiment, a device's list of authorized users and a user's list of authorized devices for which location can be determined is stored in the cloud and is accessed by that device, via, for example, a VPN tunnel to a secure source. In some embodiments, a device, such as a physical door lock, may be opened using the third-party authentication described herein.

In accordance with other embodiments of the present invention, other types of information that are not location-related may be used to authenticate a device's self-reported GPS location. Such information would be known by both the third-party (e.g., a mobile network operator) and the user's device. For example, a currently assigned cell tower frequency slot (e.g., slot no. 123) would be known by both the device (being connected to the tower on a frequency slot that it is aware of) and would also be known by the mobile network operator. The device may be configured to report what frequency slot it was currently assigned to. This information may be authenticated by comparing the device's reported frequency to the frequency that network operator has assigned to the device. Such real-time assigned frequency information would be difficult to know or guessed by a hacker outside of the systems or area. The terms frequency and frequency slot are understood to refer the specific frequency on which the device is communicating with the mobile tower it is in communication with. Other similar information, such as side-channel assignment, RF power settings, IMEI, identification information, and any other data known both by the device and the network that the device is registered on could also be used for verification. Such non-user-location information is advantageous in areas (such as some parts of Europe) that protect against network-based disclosure of device information.

Some embodiments of the present invention may be used in cooperation with a remote computer access system. A user may gain access to such a remote access systems (after the connection is authorized/enabled in accordance with any of the embodiment of the present invention) using a text shell terminal-like window, a graphical user interface (i.e. connecting to a Mac or a Windows or UNIX or other similar) on the remote access system. Other remote access systems include, for example, remote access desktops, remote databases, remote order entry systems, remote security systems, remote servers, remote virtual machines (i.e. VMware, Amazon, etc.), remote PCs (e.g. GoToMyPC, LogMeIn, VNC, etc.), remote mainframe, remote desktop, remote systems for use with troubleshooting or customer service, or any other type of remote computer system or interface.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices. Additionally or alternatively, the method, apparatus, and computer program product of an example embodiment may be embodied by fixed computing devices, such as a personal computer or a computer workstation. Still further, example embodiments may be embodied by any of a variety of mobile terminals, such as a mobile telephone, smartphone, laptop computer, tablet computer, or any combination of the aforementioned devices.

Referring back to FIG. 1, an example computing system is shown, within which embodiments of the present invention may operate. A user 110 may access a base station 112, via mobile device 108, which may then be configured to communicate with authentication service 102 via a network 114 (e.g., the Internet, or the like). Moreover, the authentication service 102 may comprise a server 104 in communication with a database 106.

The server 104 may be embodied as a computer or computers as known in the art. The server 104 may provide for receiving of electronic data from various sources, including but not necessarily limited to the user device 108 and base station 112. The server 104 may be configured to facilitate, authorize, enable, or verify various actions (e.g., e-commerce transactions) based on, for example, location information provided by various user devices or the like.

The database 106 may be embodied as a data storage device such as a Network Attached Storage (NAS) device or devices, or as a separate database server or servers. The database 106 includes information accessed and stored by the server 104 to facilitate the operations of the authentication service 102. For example, the database 106 may include, without limitation, user account credentials, biometric data, and the like for system administrators and any number and types of various users.

The user device 108 may be any computing device as known in the art and operated by a user. Electronic data received by the server 104 from the user device may be provided in various forms and via various methods. For example, the user device may include desktop computers, laptop computers, smartphones, netbooks, tablet computers, wearables, and the like. The information may be provided through various sources on the user device.

In embodiments where a user device 108 is a mobile device, such as a smart phone or tablet, the user device 108 may execute an "app" to interact with the authentication service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

FIG. 2A is an exemplary schematic diagram of an example network 200 that may be configured to perform authentication in accordance with one embodiment of the present invention. FIG. 2A shows a mobile device 250 that communicates with server 290 and computer device 270a. Computer device 270 also communicates with server 290.

FIG. 2B is an exemplary schematic diagram of an example network 200 that may be configured to perform authentication in accordance with one embodiment of the present invention. FIG. 2B shows a mobile device 250 that communicates with server 290 and point of sale terminal 270b. Point of sale terminal 270 also communicates with server 290.

Example Apparatus for Implementing Embodiments of the Present Invention

The server 104 may be embodied by one or more computing systems, such as apparatus 300 shown in FIG. 3. As illustrated in FIG. 3, the apparatus 300 may include a processor 302, a memory 304, input/output circuitry 306, communications circuitry 308 and authentication module 310. The apparatus 300 may be configured to execute the operations described above with respect to FIG. 1 and below with respect to FIGS. 4-7. Although these components 302-310 are described with respect to functional limitations, it should be understood that the particular implementations necessarily include the use of particular hardware. It should also be understood that certain of these components 302-310 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present invention.

The processor 2302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Authentication circuitry 310 includes hardware configured to facilitate the authentication, determination, or verification of a user's geographic location in order to authorize an action. The promotion circuitry 310 may utilize processing circuitry, such as the processor 302, to perform these actions. However, it should also be appreciated that, in some embodiments, the promotion circuitry 310 may include a separate processor, specially configured field programmable gate array (FPGA), or application specific interface circuit (ASIC) to perform the various function described herewith. The promotion circuitry 310 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations for Implementing Embodiments of the Present Invention

Authentication Process

As described above, in accordance with embodiments of the present invention, a hardware-based device (e.g., a mobile phone) associated with a user's account, of which device's location can be independently verified by a highly-secure third-party, is added into the overall security process.

FIG. 4 shows a flowchart describing an exemplary authentication process verifying, validating or otherwise confirming the location of a first device, for example, using a second device, for example, before enabling or allowing action (e.g., logging in to a website, a purchase, or the like). In some embodiments, the first device may be embodied by, for example, a desktop, laptop, tablet or the like and the second device may be embodied, for example, by a user's mobile device. One of ordinary skill may be appreciate, however, that the embodiments of the present invention are not so limited. For example the first and second devices may be embodied by any combinations of desktop, laptop, tablet, mobile computing device, wearable computing device, internet of things computing device, terminal, point-of-sale terminal, vehicle, physical locking device such as a door lock, home security system, perimeter control device, cloud application, cloud server, virtual desktop, virtual machine, virtual mobile device, virtual tablet device, biometric sensing system, or similar related devices, and the like.

Assuming that the user's browser server website is associated with a user's mobile phone number/email address/voice phone number, then these "second factor" approaches serve to further validate and confirm that the user is who he says.

As described above, conventional authorization techniques suffer from a number of shortcomings. For example, due the ongoing effort required by the user to repeatedly enter the identification sequence, the user adoption rate is low due. Furthermore, some users have to pay extra to receive the text message. Delivery of such text messages may at times be slow and take minutes or even hours. As such, a closed-loop security validation process requires almost no effort by the user, thereby saving the user time and money, is provided.

To start, in some embodiments, the first device and the second device are pre-authenticated. That is, as shown in block 405 of FIG. 4, an apparatus, such as apparatus 400, may be configured for authenticating one or more of a first device and a second device. As described elsewhere, the first device and/or the second device may be embodied by any form of computing device. In some embodiments, the authentication is a pre-processing step that occurs at a time before (e.g., minutes, hours, days, or weeks) before the subsequent steps. For example, in some embodiments, the first device (e.g., a desktop, laptop, or the like) and/or the second device may be previously authenticated during a registration process or the like. The authentication may be done by various means including, using hardware identifiers (e.g., serial numbers) software identifiers (e.g., licenses) and the like.

Subsequently, as shown in block 410 of FIG. 4, an apparatus, such as apparatus 300, may be configured for receiving a request from, for example, the second device (e.g., operated by the user, using a browser on the authenticated desktop/laptop) to start a session with a client server. As shown in block 415 of FIG. 4, an apparatus, such as apparatus 300, may be configured for causing the client server to sends an alert to the second device (e.g., the user's authenticated mobile device) to search for the first device (e.g., the user's previously authenticated desktop/laptop).

A desktop/laptop computer often comes with installed client software (in any form including, for example, browser plug-in, native desktop software app, operating system service, etc.) Such software drives hardware on that desktop/laptop such as a Bluetooth interface, an RFID interface, a WiFi interface, or any similar wireless interface that, in accordance with some embodiments of the present invention, enables the computer to be used as a "beacon" that can be wirelessly detected by the user's mobile phone. In some embodiments, the communication between the desktop/laptop and the user's mobile device may be carried out via a wired connection. In such embodiments, the desktop/laptop device may emit a packet over a local wired connection which may then be detected by the mobile phone's local LAN connection. Such embodiments may not be as secure since this wired packet may be transmitted, possibly, from a distant hacker.

In some embodiments, the communication between the desktop/laptop and the user's mobile device may be carried out via a digital optical connection. In such embodiments, the desktop/laptop may emit a packet over a local optical connection which would then be detected by the mobile phone's local LAN connection. This embodiment may not be as secure since this wired packet could be transmitted, possibly, from a distant hacker.

In some embodiments, the communication between the desktop/laptop and the user's mobile device may be carried out via a visual optical connection. In such embodiments, the desktop/laptop may emit an optical signal via an optical coupling which may then be detected by the mobile phone's visual input sensors (e.g., camera) or an ambient light detector.

In some embodiments, the communication between the desktop/laptop and the user's mobile device may be carried out via an acoustic or sound connection. In such embodiments, the desktop/laptop may emit data via audio waves which would then be detected by the mobile phone's microphone.

In some embodiments, regardless of the communication channel between the desktop/laptop device and the user's mobile device (whether by RF, wireless, optical, visual, sonic, and the like), code running on the desktop/laptop device is controlled by a server software adapted to activate the desktop/laptop's "beacon" transmitter to transmit a unique identifying data sequence which is subsequently detected by the user's mobile device. The server may also transmit a "wake up signal" to the user's mobile device to cause the mobile device to begin listening for the beacon signal. That "wake up signal" may take the form of text message, via a third-party messaging system (e.g., Apple), via a signal sent over a wireless telephone network, via a signal sent over a Wi-Fi network, and the like.

In some embodiments, the mobile device may be caused to continuously listen for beacon transmissions. After the user's mobile device detects the beacon, the mobile device retransmits that beacon to the server, which may be the same server that sent the originating identifying data to the desktop/laptop, or another server that compares the data strings.

In the event that the second device (e.g., the user's authenticated desktop/laptop) is found, as shown in block 420 of FIG. 4, an apparatus, such as apparatus 300, may be configured for causing the first device (e.g., the user's authenticated mobile device) to communicate with the second device (e.g., user's authenticated desktop/laptop device) to verify that the proximity of the first device (e.g., user's authenticated mobile device) to the second device. That is, the apparatus may cause the first device to determine, verify, or otherwise confirm that the first device is located in close proximity (e.g., within a pre-defined range, for example, close enough that one or more short range wireless communication methods may be performed) to the second device (e.g., the user's authenticated desktop/laptop device).

Once communication is established, the result may then be sent. Accordingly, as shown in block 425 of FIG. 4, an apparatus, such as apparatus 300, may be configured for causing transmission of the result of the proximity determination/verification/confirmation, for example, to the authentication server.

As shown in block 430 of FIG. 4, an apparatus, such as apparatus 300, may be configured for causing the authentication server to communicate, for example, with the browser of the user's authenticated desktop/laptop to obtain a first identifying data string. Concurrently, or in some embodiments, preceding or subsequent to the previous step, as shown in block 435 of FIG. 4, an apparatus, such as apparatus 300, may be configured for causing the authentication server to communicate with a trusted portion of the second device (e.g., user's authenticated desktop/laptop) to obtain a second identifying data string.

As shown in block 440 of FIG. 4, an apparatus, such as apparatus 300, may be configured for causing, for example, the authentication server to perform a comparison or, comparing, the two "identifying data strings" (e.g., comparing the first identifying string and the second identifying string) to determine if there is a match.

In an instance in which a match is detected, As shown in block 445 of FIG. 4, an apparatus, such as apparatus 300, may be configured for authorizing an action or request (such as a login access request or a file transmission request). In an instance in which no match is detected, as shown in block 450 of FIG. 4, the apparatus may be configured for enabling the user to retry to gain access for a predefined number of attempts. In an instance in which after the predefined number of attempts, no match is found, as shown in block 455 of FIG. 4, the apparatus may be configured for denying the action or request to gain access.

In some embodiments, the comparison between the two "identifying data strings" is performed by the user's authenticated desktop/laptop device. In yet another embodiment, the comparison between the two "identifying data strings" may be performed by the user's authenticated mobile device. In this particular embodiment, an easy to use and secure three stage authentication process is achieved. First, the user must possess both previously authenticated laptop/desktop and mobile devices. Second, the mobile device must be in close proximity to the laptop/desktop, which authenticates the location of both devices. Third, the readings from the browser and the laptop/desktop much match, which authenticates the browser of the laptop/desktop.

Authentication Enhanced with Biometric Sensing

In accordance with some embodiments of the present invention, authentication using location sensing is enhanced with biometric sensing performed by the device (e.g. fingerprint sensor, eye iris scanner, etc.) performed by the device. In some embodiments, authentication using location sensing is further enhanced by using a logging history which keeps track of users, together with their fingerprint and location information, who have attempted to "log in" to the device. It is understood that bio input devices, such as fingerprint scanners, may be disposed on desktops, laptops, mobile devices and the like.

Accordingly, in some embodiments, a device with a biometric sensor and a location identification system (GPS, mobile phone network verified location (antenna), etc.) establishes communication with another nearby device (PC, router, ATM cash machine, credit card point-of-sale machine, etc.) to link the user (the user's biometric samples), to a device (with a GPS or other verified location), along with this 3rd device (e.g. credit card point-of-sale machine, etc.), to provide a collection of inputs in order to authorize access. Such communication may be achieved be via a RF link (Bluetooth, Wi-Fi, Zlink, or similar), a visual link (QR code, etc.), ultrasonic or other audio link, inductive link, conductive link, NFC, electrostatic, or the like.

In some embodiments, a device with a biometric sensor and a location identification system (GPS, mobile phone network verified location (antenna), etc.) establishes communication with another nearby device (PC, router, ATM cash machine, credit card point-of-sale machine, etc.) to link the user (the user's biometric samples), to a device (with a GPS or other verified location), along with this 3rd device (e.g. credit card point-of-sale machine, etc.), to provide a collection of inputs in order to authorize access. In the authorization sequence, the location of the device (e.g. mobile phone device) would be detected by means of GPS, WiFi, or mobile network location information (mobile network based reported device's location), then compared to the 3rd device's location (i.e. the location of the credit card point-of-sale machine) to confirm that the user, the user's biometric inputs, the user's device, and/or the 3rd device (i.e. the location of the credit card point-of-sale machine) are in the vicinity of the same location (within a predefined distance range of each other).

In some embodiments, a device with a biometric input and a location identification system (GPS, mobile phone network verified location (antenna), etc.) establishes communication with another nearby device in a public location (e.g. an ATM machine, etc.) to provide a collection of inputs as part of access authorization protocol (to further authenticate the user who is using that ATM machine). In the authorization sequence, the location of the device (e.g. mobile phone device) detected by means of GPS, WiFi, or mobile network location information (mobile network based reported device's location), may be added to an optional biometric input (or PIN o or other user-entered sequence or input) and then compared to the 3rd device's location (i.e. ATM machine) to confirm that the user, the user's biometric inputs, the user's device, and/or the 3rd device (i.e. the ATM machine) are in the vicinity of the same location (within a distance range of each other). In another embodiment, the user's input or verification into that 3rd device (e.g. the ATM machine) is used to validate a transaction on the user's (e.g. mobile phone) device.

In some embodiments, a device with a biometric input and a location identification system (GPS, mobile phone network verified location (antenna), etc.) establishes communication with a nearby device in a private or access-limited location (e.g. a device connected to a home television such as a DirectTV set-top box) to provide a collection of as part of access authorization protocol (to further authenticate the user who is using that ATM machine). In the authorization sequence, the location of the device (e.g. mobile phone device) is detected by means of GPS, WiFi, or mobile network location information (mobile network based reported device's location), may be added to optional biometric input (or PIN o or other user-entered sequence or input) and then compared to the 3rd device's location (i.e. DirectTV set-top box) to confirm that the user, the user's biometric inputs, the user's device, and/or the 3rd device (i.e. the ATM machine) are in the vicinity of the same location (within a distance range of each other). In another embodiment, the user's input or verification into that 3rd device (e.g. DirectTV set-top box) is used to validate a transaction on the user's (e.g. mobile phone) device.

Embodiments of the present invention, as described above, may be used to authorize access by a physical access device, such as an electronic door lock, a vault lock, a car lock, a hotel room lock, a gate, an electronic mobile lock, an electronic bike lock, an electronic device which engages or disengages, or other device with electronically-controlled physical access, and the like. In such cases, the physical access device's location is either known and preset into a storage space, in accordance with any of the embodiments of the present invention or reported as an input for proximity comparison to the user/user's device.

Some embodiments of the present invention may be used to establish communications with a sensor adapted to sense inputs from a sub-dermal (under the skin) mounted device or transmitter. The sensed signals are used by any of the embodiments of the present invention, as described above, to achieve authentication.

Exemplary Embodiments

Financial Transactions

In some embodiments, the system may be configured for authorizing financial transactions. FIG. 5 shows exemplary process for utilizing, for example, the systems and apparatus provided above with reference to FIGS. 1-3 to authorize financial transactions, in accordance with some embodiments discussed herein. As is typical, such a transactions, for example, may be initiated when a user swipes a credit or debit card (or any other payment form such as a gift card) through a point-of-sale device (such as magnetic credit card reader), and subsequently, the card information is sent to a location other than the point-of-sale device (such as a central server).

The point-of-sale device may then be configured to provide the information to the authentication apparatus. As shown at step 505, the apparatus may be configured to, upon initiation of a transaction at a POS device configured to transmit information (e.g., payment method information, identification information, transaction information, etc.), receiving the a portion of the information, for example, such as the payment method (e.g., card) information and identifying the user with which the card information is associated and the mobile device. That is, in some embodiments, the apparatus may be configured to receive the card information. Once received, the apparatus may be configured to identify the user with which the card information is associated and the mobile device (e.g., the phone number or the like) with which the user is associated. Upon identification of the mobile device associated with the information, as shown at step 510, the apparatus may be configured to cause a message to be sent to a mobile device that was associated with that credit (or similar) card. For example, the apparatus may be configured to cause a message to be sent to an associated mobile device requesting, for example, one or more of location information and biometric data.

In some embodiments, in accordance with the message sent to the mobile device, the mobile device may then request the user to perform a biometric scan (e.g., a finger print, an iris scan, or the like). The biometric input or other results from the biometric scan are then sent back to the server as verifying response. As such, as shown at step 515, the apparatus may be configured to receive the biometric input. In some embodiments, the apparatus may be configured to, subsequent to the mobile device performing a location determination and/or requesting biometric input, receive the geographic location information and biometric data.

In some embodiments, for further security, the device's location is sent by the device to the server (the device's location could be determined by any of the methods: i) GPS or similar; ii) device-sensed assigned or nearby towers such as mobile phone towers or WiFi base stations) or via network-supplied user location information (e.g. Verizon reports to the server the location that Verizon reports the location where the user is at). Accordingly, the apparatus may be configured to then use this additional input (location and biometric input) to validate or further validate the transaction. As shown at step 520, the apparatus may be configure to validate the transaction based on, or in some embodiments, as a function of the geographic location information and biometric data.

The location of the user/user's device could be determined to be valid based on one or more of: a) location of this merchant where the transaction is happening (if the user's device location matches the merchant location then the result is determined to be OK and would result in a "card present" confirmation; b) location of a user's common location (such as his home address or work address, etc.) c) User's recent and/or common locations (favorite shopping mall, etc.); d) other location which is determined to be valid; e) location of the user's device matches "known good" prior locations (such as the user's house) such as a user's frequently or recently visited areas or regions.

One of ordinary skill would appreciate that embodiments of the present invention, equally apply to other applications and situations, such as, security, access, authentication, authorization, verifications, or otherwise, in accordance with the location reported by the device determined using on-board sensors such as GPS, Wi-Fi, etc. and/or some combination of software, or with the location reported by a third party (e.g. a cell phone carrier or tower to which a device is connected).

Logging in to an Online Web or Mobile Website

In some embodiments, the system may be configured to authorize a user to login to an online or mobile website, in accordance with some embodiments discussed herein. First, the apparatus is configured to provide a login process, for example, by receiving login information at a website upon the user entering their login ID and optionally a password. Subsequently, the apparatus may be configured to receive the login request and then sends a message to the user's device. The apparatus may then be configured to cause a message to be sent to a mobile device that was prior associated with that credit (or similar) card. The apparatus may be configured to transmit, to the mobile device, a request that the user perform a biometric scan (such as a finger print or an iris scan or similar). Once the mobile device prompts the user for the biometric information, the apparatus may be configured to receive information indicative of the biometric input or other results from that biometric scan as verifying response. In some embodiments, for example, for further security, the device's location is sent by the device to the server. The device's location may be determined by any of the methods of i) GPS or similar; ii) device-sensed assigned or nearby towers such as mobile phone towers or WiFi base stations; or via network-supplied user location information (e.g. Verizon reports to the server the location of the user). The apparatus may be configured to use this additional input (location and biometric input) to validate or further validate the transaction.

The location of the user/user's device may be determined to be valid based on one or more of: a) location of this merchant where the transaction is happening (if the user's device location matches the merchant location then the result is determined to be OK and would result in a "card present" confirmation; b) location of a user's common location (such as his home address or work address, etc.); c) user's recent and/or common locations (favorite shopping mall, etc.); d) other location which is determined to be valid; e) location of the user's device matches "known good" prior locations, such as the user's house, or the user's frequently or recently visited areas or regions. Embodiments of the present invention, as described above, may be similarly applied to remote desktop access login via a desktop or a tablet-top or smartphone application.

Other Embodiments

Some embodiments of the present invention are used to validate a credit card purchase where the card is present ("Card-Present" transaction) using location information delivered by a verified third party, e.g. a cell phone network to check the location of the matching phone. If the user is carrying his or her phone at the time of the purchase (the majority of cases), the phone's location will match the credit purchase's reported location and thus verify or validate the purchase. Such a method is useful in reducing the risk of credit card fraud to the merchant, card company (e.g. VISA, MasterCard, etc.), bank, and/or purchaser with the added user benefit of preventing automatic credit card locks when suspicious activity is detected. The card company, merchant, bank, and/or user can thus determine whether the location of the device matches the location of the purchase whether before, during, or after the purchase takes place.

Some embodiments of the present invention may couple the location verification of the device through a 3rd party trusted source with one or more additional verification steps, such as requiring a 4-digit PIN, a fingerprint, etc. to validate and process the credit card transaction or to provide the user with greater rewards (e.g. 1% cash back, "points" toward a flight or hotel, etc.) as a partial or full value for the reduced risk of fraud and the costs associated with it to the card companies and merchants with additional verifications of a credit card purchase.

Some embodiments of the present invention are used to perform online purchases. In such embodiments, the user makes a credit card purchase online, such as at Amazon.com, eBay.com, Walmart.com, etc. The user's phone then requests or allows the user to further verify that the transaction was valid by one or more of the following methods coupled to verified location: fingerprint, 4-digit PIN, password. In all such instances, the user may optionally receive rewards for performing such a verification of a "Card Not Present" transaction, thus reducing the risk of fraudulent transactions and the costs associated with it. The merchant (e.g. Amazon), to reduce fees paid to the card company (e.g. Visa) covering risks of fraud, may also require such a verification to take place in order to complete the purchase.

Embodiments of the present invention equally apply to such situations as, for example, where a person wishes to transfer money or other digital currency, data, or any other goods, services, or credits to another person or merchant whereby the transaction is verified before, during, or after using one or more of biosensors, location-sensing (whether on device or through third-party verifications), PIN numbers, passwords, and the like. Embodiments of the present invention equally apply to such situations as, for example, when a person wants to purchase or pay for something, and a second party, such as a boss, VP of finance, trusted friend, or parent must verify or approve the purchase. This approval may optionally be required over a certain amount, such as, for example, any purchase above $20.

In one embodiment, a vehicle equipped with a mobile phone modem, either built into the car, added-on, or carried, is located via a RF-paired mobile device and unlocked remotely via fingerprint, PIN code, password, multi-party verification, location, or other mechanism entered through or acquired via the mobile device. Optionally the location from which an attempt to unlock or remotely start the car (derived from the mobile device) may be compared against the vehicle's location to identify that both are in the same place or nearby area.

In most cases, a car or any other moving vehicle and its owner's phone remain in similar locations. In the event a phone or car is lost or stolen, those locations diverge. In such situations, some embodiments of the present invention alter the user through an available device or the car, and/or lock the vehicle and/or phone and/or provide remote shutdown or access controls or overrides.

In one embodiment, a biometric input device is coupled to a website. A single website click performs a web action as well as initiates a fingerprint, biometric request, or other verification on the same or separate device. One method to implement this is a verification service provides an API or SDK which the developer of the website integrates into the website. In one embodiment, a web action on a website (such as a button press)—a single click—prompts the user to verify, and thereafter initiates a sequence of actions requesting additional verification using a biometric input, location, etc. on a device other than the device which the web browser is running. In another embodiment, a web action on a website (such as a button press)—a single click—prompts the user to verify, and thereafter initiates a sequence of actions requesting additional verification using a biometric input, location, etc. on the same device. Other embodiments provide a separate device connected wirelessly to a web server (e.g. a wireless device that has a fingerprint scanner which could also be a mobile phone), coupled via the internet to one or more wireless connections.

In accordance with some embodiments of the present invention, a user can log in with a username (or email or an identifier) and a password, which then initiates the fingerprint request. A website and/or user can configure it so that it would only require a username/email/identifier, which would then be sufficient to initiate the fingerprint request from the device. Alternatively, a website and/or user can configure it so that the username/email/identifier and/or the password/access token are stored on the client-side, in local storage or as a cookie or other client-side forms of data storage, to simply initiate the fingerprint verification with a single button press because the username and/or access token/password was "remembered" by browser. Thus, the user does not have to enter it again.

In accordance with some embodiment of the present invention, logging into a single website may optionally log in the user simultaneously into other websites connected to that person's account through an independent verification service. Thus the user logs in once using biometric or other verification described herein, and that automatically (optionally with or without additional button presses to log in on other sites) logs in the user or caches the authentication/credentials to allow login over longer periods of time without repeatedly needing to verify. The user may optionally configure the length of time in which a single authorization is "remembered"; the user is thus not asked to verify again and is simply logged in again automatically, whether on that service or on other services connected to the same verification system.

In accordance with one embodiment of the present invention, the location of a mobile device is first verified using any of the embodiments described above. The mobile device then transmits its determined location to a wireless network, such as WiFi, Bluetooth, and the like. The wirelessly transmitted location information is thereafter received by the computer system (e.g., desktop or laptop computer) to which the user has logged into. The computer system subsequently relays the location information to a server computer operated by an independent third party seeking to verify that the computer system the user has logged into and the user's associated mobile device are in the same as part of the authentication process.

Two Factor Authentication (2FA) is a known technique for verifying user authentication. Such a technique may be used, for example, when a user attempting to access the internet via a browser of desktop/laptop computer, also has access to a mobile phone. In this example, a user might interact with a web server via his web browser on his desktop/laptop, thereby causing an identifying sequence (e.g., a 6-digit numeric code) to be sent to that user's mobile device via an SMS text. Other examples include instances where a code is sent to that user's email or spoken to the user via a voice call. The user then enters the received numeric string into the browser of his desktop/laptop to gain access to the desired web site. Various alternate implementations exist with different techniques but the overall goal often is to: authenticate that the user on the browser is in fact who he claims to be by "closing the loop" whereby the system sends information on one channel (text message system) and that information is then copied/transferred into the desktop/laptop browser.

Data Flow Diagrams

FIG. 6 is an exemplary flow diagram 600 showing a sequence of actions performed to perform authentication in accordance with one embodiment of the present invention. For example, flow diagram 600 may be performed when a user attempts to log-in to a client server using a computer that has been previously authorized by the client server. The computer is assumed to be running a web browser that includes, in part an authentication javascript (JS) software development kit (sdk) (hereinafter referred to as authentication JS sdk) and a client javascript (hereinafter referred to as client JS). The authentication JS sdk may be software code in the web browser adapted to communicate with an (application program interface) API server. The client JS may be javascript code running on the browser. In some embodiments, the client JS may be responsible for presenting a log-in screen to a user in order to enable the user to log into the client server. Although in FIG. 3 the authentication JS sdk, client JS, and the trusted agent are shown as being included in the user's computer, it is understood that in other embodiments, one or more these elements may reside outside the user's computer. Flow diagram 600 enables a user of a computer to be authenticated with little effort. For example, the user may be authenticated by simply moving a mouse, as described further below.

As shown in FIG. 6, at 601, the authentication JS sdk promptsclient JS to supply an account ID and a key. The account ID may contain information that uniquely identifies a user. For example, the account ID, may be a username, a password, email address, any combinations thereof, and the like. The key may be any information that uniquely identifies a service or service provider associated with the client server. For example, the key may include an alphanumeric code, or the like. At 603, a web socket protocol is used to create a communication channel between the authentication JS sdk and the API server. Utilizing this communication channel, the authentication JS sdk transmits the account ID and key to the API server. The API server may be an authentication server.

At 605, the API server generates and transmits, to the authentication JS sdk, a session ID. The session ID may include any information that uniquely identifies the session between the authentication JS sdk and the API Server. For example, the session ID may be an alphanumeric code, or the like. At 607, the authentication JS sdk transmits the received session ID to the client JS. At 609, the client JS communicates (e.g. by HTTP) the session ID and the account ID to the client server.

At 611, the client server generates a secret code and communicates (e.g. by HTTP) the received session ID, along with the secret code to the API server. The secret code may include any information that only the client server and the API server know. For example, the secret code may be a securely generated (e.g. DES, AES, RSA, random number, or pseudorandom number generated) numeric or alphanumeric code, and the like. The secret may be used in all subsequent communications from the API server to the client server to verify communication is coming from API server. Optionally, the client server may also generate or receive a list of accepted locations. These list of accepted locations indicates locations that the user may log-in from. The list of accepted locations may include geographic limitations of where the user may be located. For example, the accepted locations may correspond to a particular address, region, or area. The client server, at 611, may transmit the accepted locations to the API server along with the session ID and the secret code.

Between steps 601 and 611, if an error is detected in the process (e.g. web socket not established at 603) then the step(s) prior to the step where the error occurred is retried. However, if an error occurs at any step after 611 then an error process is started, as described in more detail below in reference to FIG. 5.

At 613, the client server performs a silent push to send the session ID to one or more phones associated with the user. In some embodiments, the client server silently pushes the session ID to the phone using a client application operating on the phone.

At 615, the phone receives, from the trusted agent, an agent ID. The agent ID may include any information that uniquely identifies the trusted agent. For example, the agent ID may be an alphanumeric code, numeric code, and the like. The phone may receive the agent ID by any wired or wireless communication channels, including, but not limited to, Bluetooth, Near Field Communication (NFC), Infrared, Universal Serial Bus, audio waves (both human audible and human inaudible) and the like. In some embodiments, the trusted agent may be implemented as trusted hardware (e.g. a trust platform module, tamper resistant hardware) or trusted software (e.g. encrypted software, tamper resistant hardware) associated with the user's computer. In some embodiments the trusted agent is supplied by the client server. In some embodiments, the trusted agent continuously broadcasts its agent ID such that any phone in the broadcast range may detect the agent ID. The phone transmits (e.g. using HTTP) the agent ID and the session ID to the API server. Optionally, the phone may generate and transmit data representative of its location to the API server. The phone's location may be determined by various methods, including software location identification (GPS), network location identification (cellular triangulation, WiFi access point location), and the like.

At 617, the API sever, utilizing the previously established communication channel, sends a request to the authentication JS sdk to obtain, for example, mouse movement information associated with the user's computer. Mouse movement information may be any information describing the user's use of a mouse in connection with user's computer, such as the X and Y coordinates associated with the mouse movement and/or the time of the mouse movement. In some embodiments, the request from the API server for the mouse movement may cause the authentication JS sdk to prompt the user to move the mouse such that the authentication JS sdk may collect mouse movement data. In other embodiments, the authentication JS sdk may access recently stored mouse movement data from previous user actions (e.g. logging into the computer, or opening a program, and the like). Although 617 describes authentication using mouse movement, it is within the scope of the invention to use any type of user activity related to a computer. For example, user activity may include touching of the touch screen of the computer, typing on a keyboard connected to the computer, speaking to the computer, and the like.

At 619, the API sever, sends a silent push to the trusted agent to receive mouse movement information associated with the user's computer. At 621, the authentication JS sdk sends the mouse movement information to the API server. At 623, the trusted agent sends the mouse movement information to the API server. The API server then performs a comparison to determine if there is a match between the mouse movement information received from the trusted agent and the mouse movement information received from the authentication JS sdk. A match may be an exact match. Alternatively, a match may be detected when the difference between the two movement information falls within a predefined range.

If a match is detected at 625 a HTTP 200 message indicating a successful authentication is sent, by the API server, to the phone. Likewise at 627, the API server sends a valid authentication message to the client server with the secret. At 629, the client server grants access to the user to log-in to the client server via the client JS.

FIG. 7 is an exemplary flow diagram 700 showing a sequence of actions performed to perform authentication in accordance with one embodiment of the present invention. For example, flow diagram 700 may be performed when a user attempts to log-in to a client server using a computer that has not been previously authorized by the client server. Actions 601-623 of are similar to actions 601-623 described in reference to FIG. 6.

Between steps 601 and 611, if an error is detected in the process (e.g. web socket not established at 603) then the step(s) prior to the step where the error occurred is retried. However, if an error occurs at any step after 611 (i.e. 725-731) then an error process is started, as described in more detail below in reference to FIG. 8.

If a match is detected at 725 a HTTP 401 message indicating an unauthorized response is sent, by the API server, to the phone. The HTTP 401 indicates that the user's computer has not been previously authorized to communicate to the client server. At 727, the phone obtains and transmits, to the API server, authentication information from the user (e.g. the users fingerprint, password, pin number). Optionally, the phone may generate and transmit, to the API server, location data corresponding to the location of the phone. In some embodiments, the phone itself may perform validation of the user authentication information and transmit a validation message to the API server.

If, the API server validates the user authentication at 729, the API sends a validation message with the secret to the client server. In response at 731, the client server allows the user to log-in to the client server, using the client JS.

FIG. 8 is an exemplary flow diagram 800 showing a sequence of actions to perform authentication in accordance with one embodiment of the present invention. For example, flow diagram 800 may be performed when there is an error in the authentication process. Actions 601-611 are similar to actions 601-611 described in reference to FIG. 6.

Between steps 601 and 611, if an error is detected in the process (e.g. web socket not established at 603) then the step(s) prior to the step where the error occurred is retried. However, if an error occurs at any step after 611 then flow diagram 800 proceeds to step 813.

At 813, the API server, sends a request to the client server requesting the client server to send a push notification to the phone to obtain user authentication information. At 815, the client server, sends a push notification to the mobile phone to request the user authentication information.

At 817, the phone obtains and transmits to the the user authentication information to the API server. Optionally, the phone may generate and transmit, to the API server, location data corresponding to the location of the phone. In some embodiments, the phone may perform validation of the user authentication information and transmit validation message to the API server.

If the API server validates the user authentication information at 819, an authentication valid message along with the secret is sent to the client server. Consequently at 821, the client server allows the user to log-in to the client server, via the client JS.

All of the above described embodiments of the present invention could optionally include as part of the process a geo-location filter with the location coming from one or more of the following: a GPS on the device, cell phone network reported location, etc. This location information could either go to the device itself and/or to the server managing the login.

The above embodiments described above may be coupled with a purchase or an online transaction via the web and/or mobile phone app. For example, at Amazon.com, when a user selects "Place Order", the Place Order button may require a biometric remote input which has a triple action with that single click. It requests biometric input and upon biometric feedback, it i) initiates the purchase order, ii) initiates the payments, and iii) if the payment is successful/authorized, it completes the order. If the user completes the successful biometric input and verification, there may be a price difference to reflect the higher security and/or lower theft/fraud probability given the verified, biometric input which may optionally be tied to location as described above.

The above embodiments may be initiated on voice calls, inbound SMS purchase requests, email offers, outdoor advertising-initiated requests/sales, audio/video recognition (e.g. while watching TV, the device hears and recognizes an audio or video input, e.g. Shazam), etc.

The above embodiments of the present invention, among other things, a) significantly improve the security and reduce fraudulent access to electronic accounts; b) enable a seamless and provide quick integration with many existing electronic account providers (without the electronic account provider making any changes to their software); c) enables a user to customize the process flow to include a flexible security process; and d) enables the transfer of certain processing tasks (such as outbound sending of messages) to be filtered and monitored by the invention.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4-8 when executed, convert a computer or processing circuitry into a particular machine configured to perform an example embodiment of the present invention. Accordingly, the operations of FIGS. 4-8 define an algorithm for configuring a computer or processing to perform an example embodiment. In some cases, a general purpose computer may be provided with an instance of the processor which performs the algorithms of FIGS. 4-8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified. Moreover, in some embodiments, additional optional operations may also be included. It should be appreciated that each of the modifications, optional additions or amplifications below may be included with the operations above either alone or in combination with any others among the features described herein.

The above embodiments of the present invention may be combined, in one or multiple combinations, as various alternatives and equivalents are possible.

The above embodiments of the present invention may be in the form of an app, a web-app, a native executable, or other forms, and executed on a mobile device, a mobile phone, or mobile media player, a virtual reality device, a wearable device, a wired device, a wireless device, a tablet, a desktop, a laptop, a virtual machine, online, mobile, a cloud-based device, in 2D, in 3D, and/or similar or combinations of thereof.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer implemented authentication method for verifying, validating or otherwise confirming a location of a first device, using a second device before enabling or allowing an action, the method comprising:
   receiving a request, via an authentication session established during a log-in process, to cause the action from the second device;
   in response to receiving the request, sending an alert to the first device associated with an account associated with the requested action enabling receiving or transmitting of short range wireless communication protocol;
   causing the first device to communicate, via the short range wireless communication protocol, with the second device to verify a proximity of the first device and the second device;
   receiving verification of the proximity from the first device;
   causing a trusted agent residing on the second device to send identification information to the first device, the identification information being information that uniquely identifies the trusted agent;
   receiving, from the second device, a first identifying data string, the first identifying data string originating in a browser, operating on the second device, having been used to start the authentication session;
   receiving, from the first device, a second identifying data string, the second identifying data string originating from the trusted agent, configured as software or hardware, residing on the second device; and
   upon confirmation of a match of the first identifying data string and the second identifying data string, authorizing the action.

2. The computer implemented authentication method of claim 1, further comprising:
   receiving data indicative of a biometric input at the first device; and
   preceding authorization of the action, confirming a match of the data indicative of the biometric input to stored biometric data associated with a user of the first device.

3. The computer implemented authentication method according to claim 1, wherein the causing the first device to communicate with the second device to verify the proximity of the first device and the second device, further comprising:
   receiving an indication of a location of the first device by means of GPS, Wi-Fi, or mobile network location information;
   comparing the location of the first device to a location of the second device, the second device having a verifiable or confirmed location and being independent to the first device;
   verifying the proximity of the first device to the second device, confirming the location of the first device based on the verifiable or confirmed location of the second device.

4. The computer implemented authentication method according to claim 1, further comprising:
   upon determination of the location of the first device and preceding authorization of the action, determining the location is within a predefined authorized geo-region.

5. The computer implemented authentication method according to claim 1, further comprising:
   upon determination of the location of the first device and preceding authorization of the action, determining the location is within a predefined range of a pre-defined authorized location.

6. The computer implemented authentication method according to claim 1, further comprising:
   upon determination of the location of the first device and preceding authorization of the action, determining the location is not within a predefined un-authorized geo-region.

7. The computer implemented authentication method according to claim 1, further comprising:
   upon determination of the location of the first device by means of GPS, Wi-Fi, or mobile network location information and preceding authorization of the action, receive input at a third device; and
   upon verification of input at the third device, authorizing the action.

8. An authentication apparatus configured for verifying, validating or otherwise confirming a location of a first device, using a second device before enabling or allowing an action, the authentication apparatus comprising at least one processor and at least one memory including computer program code, the at least one memory and the computer program code configured to, with the processor, cause the authentication apparatus to at least:

receive a request, via an authentication session established during a log-in process, to cause the action from the second device;

in response to receiving the request, send an alert to the first device associated with an account associated with the requested action enabling receiving or transmitting of short range wireless communication protocol;

cause the first device to communicate, via the short range wireless communication protocol, with the second device to verify a proximity of the first device and the second device;

receive verification of the proximity from the first device;

cause a trusted agent residing on the second device to send identification information to the first device, the identification information being information that uniquely identifies the trusted agent;

receive, from the second device, a first identifying data string, the first identifying data string originating in a browser, operating on the second device, having been used to start the authentication session;

receive, from the first device, a second identifying data string, the second identifying data string originating from a-the trusted agent, configured as software or hardware, residing on the second device; and upon confirmation of a match of the first identifying data string and the second identifying data string, authorize the action.

9. The authentication apparatus of claim 1, wherein the at least one memory and the computer program code are further configured to, with the processor, cause the apparatus to:

receive data indicative of a biometric input at the first device; and preceding authorization of the action, confirming a match of the data indicative of the biometric input to stored biometric data associated with a user of the first device.

10. The authentication apparatus according to claim 1, wherein the at least one memory and the computer program code configured to cause the first device to communicate with the second device to verify the proximity of the first device and the second device is further configured to, with the processor, cause the apparatus to:

receive an indication of a location of the first device by means of GPS, Wi-Fi, or mobile network location information;

compare the location of the first device to a location of the second device, the second device having a verifiable or confirmed location and being independent to the first device;

verifying the proximity of the first device to the second device, confirming the location of the first device based on the verifiable or confirmed location of the second device.

11. The authentication apparatus according to claim 1, wherein the at least one memory and the computer program code are further configured to, with the processor, cause the apparatus to:

upon determination of the location of the first device and preceding authorization of the action, determine the location is within a predefined authorized geo-region.

12. The authentication apparatus according to claim 1, wherein the at least one memory and the computer program code are further configured to, with the processor, cause the apparatus to:

upon determination of the location of the first device and preceding authorization of the action, determine the location is within a predefined range of a pre-defined authorized location.

13. The authentication apparatus according to claim 1, wherein the at least one memory and the computer program code are further configured to, with the processor, cause the apparatus to:

upon determination of the location of the first device and preceding authorization of the action, determine the location is not within a predefined un-authorized geo-region.

14. The authentication apparatus according to claim 1, wherein the at least one memory and the computer program code are further configured to, with the processor, cause the apparatus to:

upon determination of the location of the first device by means of GPS, Wi-Fi, or mobile network location information and preceding authorization of the action, receive input at a third device; and upon verification of input at the third device, authorize the action.

15. A computer program product configured for verifying, validating or otherwise confirming a location of a first device, using a second device before enabling or allowing an action, the computer program product comprising at least one non-transitory computer-readable storage medium having computer-executable program code instructions stored therein, the computer-executable program code instructions comprising program code instructions for:

receiving a request, via an authentication session established during a log-in process, to cause the action from the second device;

in response to receiving the request, sending an alert to the first device associated with an account associated with the requested action enabling receiving or transmitting of short range wireless communication protocol;

causing the first device to communicate, via the short range wireless communication protocol, with the second device to verify a proximity of the first device and the second device;

receiving verification of the proximity from the first device;

causing a trusted agent residing on the second device to send identification information to the first device, the identification information being information that uniquely identifies the trusted agent;

receiving, from the second device, a first identifying data string, the first identifying data string originating in a browser, operating on the second device, having been used to start the authentication session;

receiving, from the first device, a second identifying data string, the second identifying data string originating from the trusted agent, configured as software or hardware, residing on the second device; and upon confirmation of a match of the first identifying data string and the second identifying data string, authorizing the action.

16. The computer program product of claim 15, wherein the computer-executable program code instructions further comprise program code instructions for:

receiving data indicative of a biometric input at the first device; and preceding authorization of the action, confirming a match of the data indicative of the biometric input to stored biometric data associated with a user of the first device.

17. The computer program product according to claim 15, wherein the computer-executable program code instructions for causing the first device to communicate with the second device to verify the proximity of the first device and the second device, further comprise program code instructions for:
  receiving an indication of a location of the first device by means of GPS, Wi-Fi, or mobile network location information;
  comparing the location of the first device to a location of the second device, the second device having a verifiable or confirmed location and being independent to the first device;
  verifying the proximity of the first device to the second device, confirming the location of the first device based on the verifiable or confirmed location of the second device.

18. The computer program product according to claim 15, wherein the computer-executable program code instructions further comprise program code instructions for:
  upon determination of the location of the first device and preceding authorization of the action, determining the location is within a predefined authorized geo-region.

19. The computer program product according to claim 15, wherein the computer-executable program code instructions further comprise program code instructions for:
  upon determination of the location of the first device and preceding authorization of the action, determining the location is within a predefined range of a pre-defined authorized location.

20. The computer program product according to claim 15, wherein the computer-executable program code instructions further comprise program code instructions for:
  upon determination of the location of the first device and preceding authorization of the action, determining the location is not within a predefined un-authorized geo-region.

21. The computer program product according to claim 15, wherein the computer-executable program code instructions further comprise program code instructions for:
  upon determination of the location of the first device by means of GPS, Wi-Fi, or mobile network location information and preceding authorization of the action, receive input at a third device; and
  upon verification of input at the third device, authorizing the action.

\* \* \* \* \*

UNITED STATES PATENT AND TRADEMARK OFFICE
CERTIFICATE OF CORRECTION

PATENT NO. : 10,375,082 B2
APPLICATION NO. : 15/243786
DATED : August 6, 2019
INVENTOR(S) : Brown et al.

Page 1 of 1

It is certified that error appears in the above-identified patent and that said Letters Patent is hereby corrected as shown below:

In the Claims

Column 29,
Line 23, in Claim 8, "a-the" should read --the--;
Line 28, in Claim 9, "claim 1" should read --claim 8--;
Line 37, in Claim 10, "claim 1" should read --claim 8--;
Line 54, in Claim 11, "claim 1" should read --claim 8--;
Line 61, in Claim 12, "claim 1" should read --claim 8--.

Column 30,
Line 5, in Claim 13, "claim 1" should read --claim 8--;
Line 13, in Claim 14, "claim 1" should read --claim 8--.

Signed and Sealed this
Third Day of March, 2020

Andrei Iancu
*Director of the United States Patent and Trademark Office*